United States Patent [19]

Piper

[11] 4,311,983
[45] Jan. 19, 1982

[54] VEHICLE PARKING SIGNAL DEVICE

[76] Inventor: Bert W. Piper, 36051 Goddard Rd., Romulus, Mich. 48174

[21] Appl. No.: 88,829

[22] Filed: Oct. 29, 1979

[51] Int. Cl.³ .............................................. G08B 3/02
[52] U.S. Cl. .................................. 340/51; 200/61.41
[58] Field of Search ................ 340/51, 61; 200/61.41, 200/61.44; 116/28 R, 56

[56] References Cited

U.S. PATENT DOCUMENTS

| 504,610 | 9/1893 | Oppman | 200/61.41 |
| 1,941,300 | 12/1933 | Hamer | 340/61 |
| 2,214,685 | 9/1940 | Stone | 340/61 |
| 2,454,896 | 11/1948 | Traub | 43/17 |

Primary Examiner—Gerald Goldberg
Assistant Examiner—Denis E. Corr

[57] ABSTRACT

An alarm device for signalling the desired parking position of a vehicle in a garage which includes a channel adapted to be secured to either the ceiling of the garage or to a pair of spaced ceiling joists in the garage. A bracket is adjustable lengthwise of the channel and pivotally supports an actuating arm adapted to be engaged by a roof-mounted antenna on the vehicle to energize an alarm also mounted on the adjustable bracket when the vehicle approaches a predetermined position in the garage.

2 Claims, 7 Drawing Figures

VEHICLE PARKING SIGNAL DEVICE

This invention relates to a vehicle positioning signal and, more particularly, to a signalling device for advising the operator of a vehicle when the vehicle is advanced to a desired parking position in a garage.

Many devices of the type described have been proposed heretofore, but, for various reasons, none has achieved any degree of commercial success. Such devices have, for the most part, been designed for mounting on the side walls or the end wall of the garage for engagement with a fixed portion of a vehicle, such as a bumper or the like. Aside from the fact that such devices must be located in a very precise location with respect to the fixed member on the vehicle to properly position the vehicle, their location relatively close to the floor surface subjects them to tampering by children and frequently occupies space in the garage which could otherwise be advantageously used as a passageway or for storage.

The primary object of this invention is to provide a signalling device for vehicles which is adapted to be mounted on the ceiling or ceiling joists of a garage and adapted to be actuated by an antenna mounted on the top of a vehicle.

Another object of the invention is to provide a wide latitude for location of the device relative to the garage itself and relative to the desired park position of the vehicle.

Other objects, features and advantages of the present invention will become apparent from the following description and accompanying drawings, in which.

Figure 1:
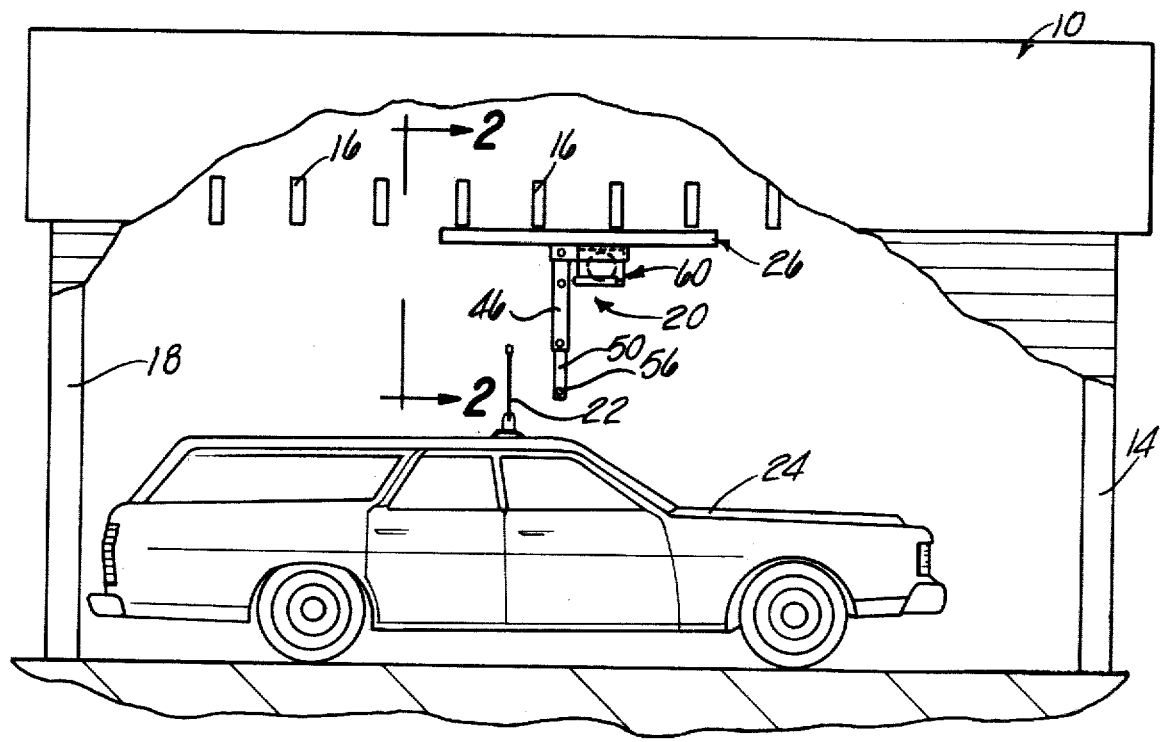
FIG. 1 is a elevational view of a garage with portions broken away, showing a vehicle parked therein and also showing the device of the present invention.
Figure 2:
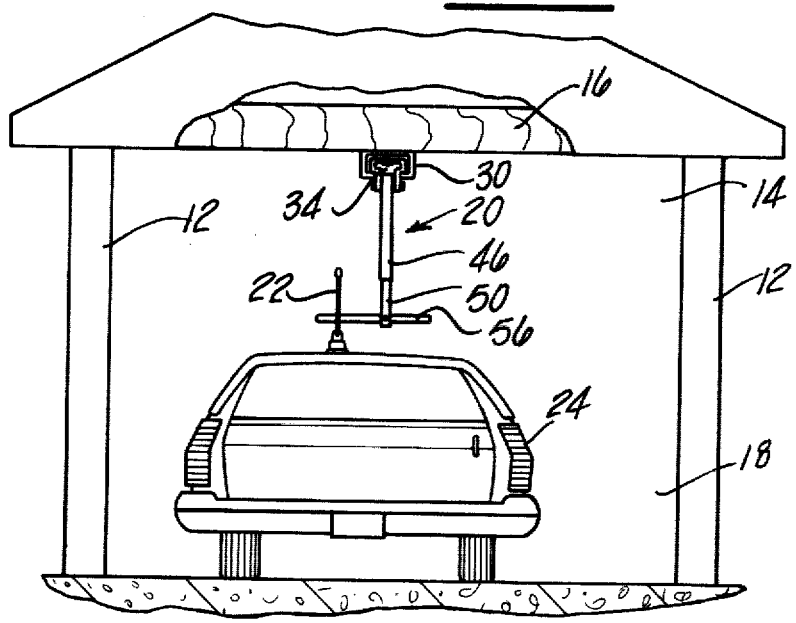
FIG. 2 is an end view of the garage with the door removed and showing the vehicle parked therein.
Figure 3:
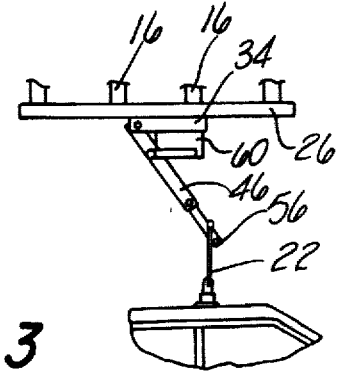
FIG. 3 is a fragmentary view showing the manner in which the device of this invention is actuated by a roof-mounted antenna on a vehicle.

Referring to FIGS. 1 and 2, a garage is generally designated 10 and includes side walls 12 and an end wall 14. The ceiling structure of the garage comprises a plurality of regularly spaced ceiling joists 16 which extend transversely of the garage, that is, in a direction parallel to the plane of the garage door opening 18. The signalling device of the present invention is generally designated 20 and is adapted to be actuated by an antenna 22 suitably secured to the roof of a vehicle 24.

Figure 4:
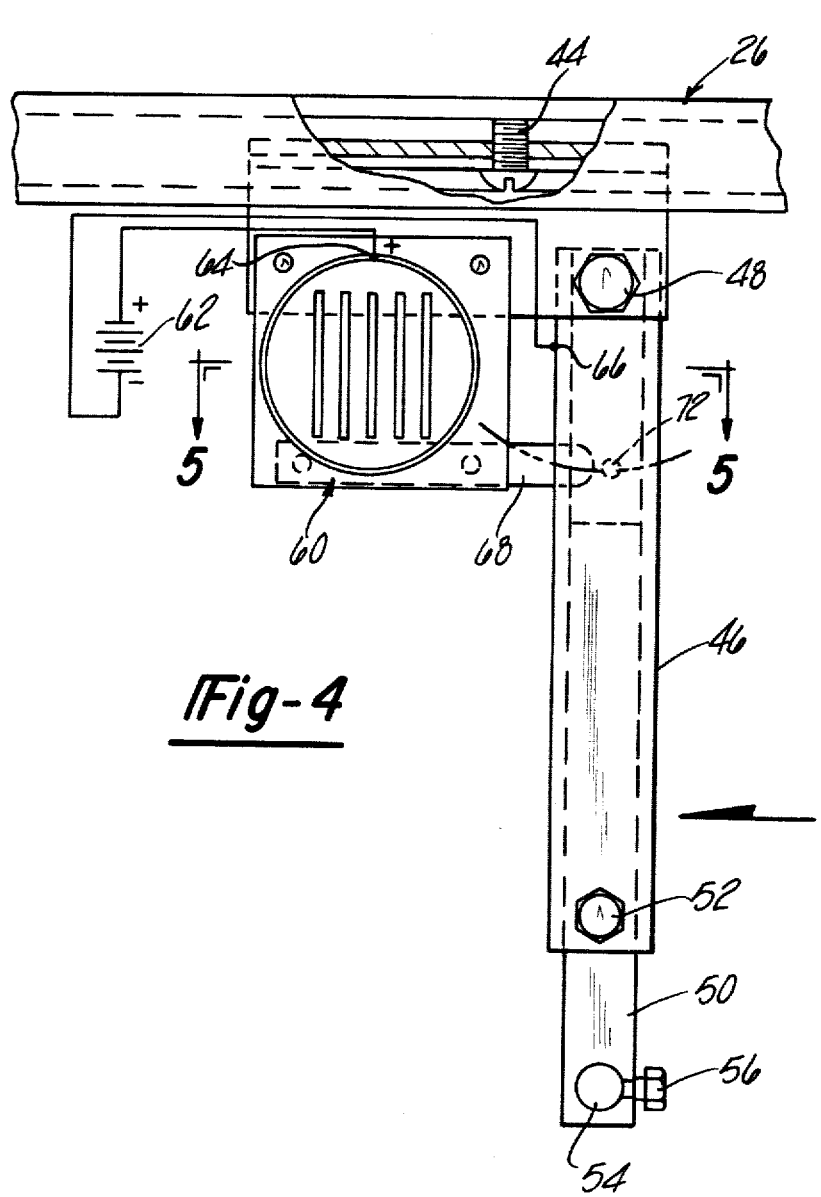
FIG. 4 is an elevational view of the device on an enlarged scale.
Figure 5:
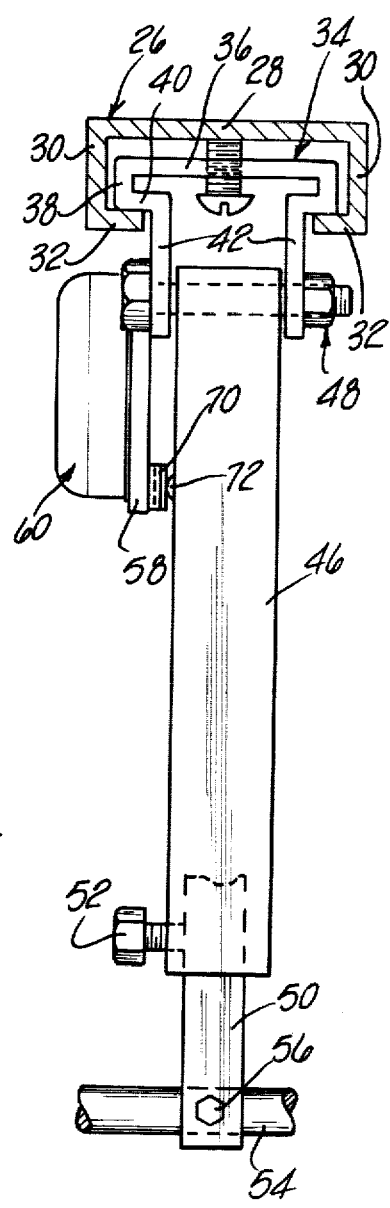
FIG. 5 is an end view of the signalling device.

Referring now to FIGS. 4 and 5, the signalling device includes a support member 26 in the form of an inverted channel having a length substantially greater than the spacing between a pair of adjacent ceiling joists 16. Channel 26 is fixedly secured to the ceiling joists 16 in the manner illustrated in FIGS. 1 and 2 so that it extends lengthwise at a location generally above and in line with a vehicle to be parked within the garage. As shown in FIG. 5, channel 26 has a top wall 28 and a pair of depending side walls 30 which terminate in opposed inwardly extending flanges 32. A support bracket 34 is slidably arranged within channel 26. Support bracket 34 is generally U-shaped and has a top wall 36, a pair of side walls 38 which are turned inwardly as at 40 so as to be slidably supported on the inwardly turned flanges 32 of channel 26. Bracket 34 also includes a pair of spaced side walls 42 which extend downwardly between flanges 32. A screw 44 extending through the top wall 36 of bracket 34 is adapted when tightened to bear against the top wall 28 of channel 26 to frictionally lock bracket 34 in a desired position lengthwise of channel 26.

A tubular metal arm 46 is pivotally supported at its upper end between the side walls 42 of bracket 34 by a nut and screw 48. Within the lower end of tubular arm 46 there is telescopically arranged a rod 50 which is vertically adjustable within arm 46. Rod 50 is adapted to be locked in a desired vertical position of adjustment by a clamping screw 52. A cross arm 54 extends through the lower end of rod 50 and is slidably adjustable therethrough. Cross arm 54 is adapted to be locked in a desired transversely adjusted position by a clamping screw 56.

An alarm mounting plate 58, preferably formed of a non-conducting material, is fixedly mounted on one of the side walls 42 of bracket 34 at a location spaced forwardly of the pivotal mounting 48 of arm 46. An alarm 60 mounted on plate 58 is preferably in the form of a conventional buzzer or bell. The electrical circuitry for alarm 60 which is also mounted on mounting plate 58 includes a small battery 62 connected at one side to the alarm as at 64 and connected at its opposite side on the alarm supporting structure such as the metal arm 46 as at 66. A leaf spring contact 68 on mounting plate 58 is electrically connected with the bell or buzzer and has an offset free end 70. Arm 46 has a button contact 72 on the side thereof facing spring contact 68. When the arm 46 is in its normal vertically depending position contact 72 is spaced from and rearwardly of the end 70 of contact 68. However, as soon as arm 46 pivots forwardly to a slight extent, button contact 72 engages the free end 70 of contact 68 thus closing the circuit through alarm 60 and sounding the buzzer or bell.

In installing the signalling device of the present invention, first the vehicle is advanced into the garage to a position approximately at the desired parking position. Thereafter, the antenna 22 is secured to the roof of the vehicle by any suitable means such as a magnet or adhesive. Channel 26 is then mounted on the roof joists 16 or other ceiling structure of the garage in a position generally centrally of and overlying the vehicle. Bracket 34 with its depending arm 46 and alarm 60 is then adjusted lengthwise of channel 26 so that the arm 46 is located slightly forwardly of the antenna 22. Bracket 34 is locked in this position by tightening screw 44. Thereafter rod 50 is adjusted vertically in arm 46 so that cross arm 54 is located below the upper end of antenna 22. Rod 50 is locked in this position by tightening screw 52. Cross arm 54 is then adjusted transversely so that it will be engaged by antenna 22 when the vehicle 24 is advanced just slightly beyond the position shown in FIG. 1.

Figure 6:
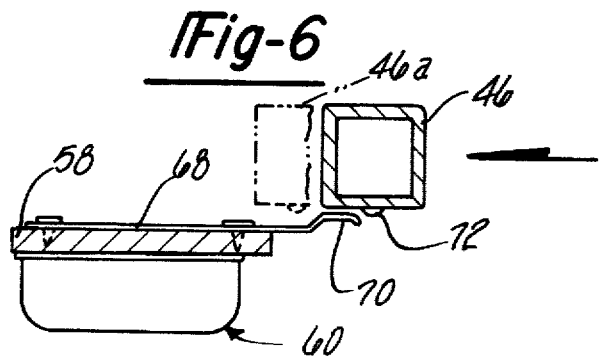
FIGS. 6 and 7 are fragmentary sectional views illustrating the manner in which the alarm is energized.
Figure 7:
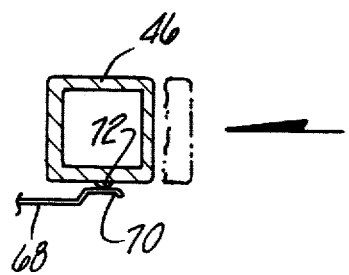

With the signalling device installed in a garage in the manner described above it will be apparent that as the vehicle is driven into the garage, as soon as it approaches the desired parking position antenna 22 will engage cross arm 54 and pivot arm 46 forwardly and upwardly about the pivot axis at 48 (clockwise as viewed in FIG. 4 and counter-clockwise as viewed in FIG. 1). When the vehicle reaches the desired parking position arm 46 will have been pivoted forwardly to a position wherein button contact 72 engages the free end 70 of contact 68 to sound the alarm 60. This pivoted position of arm 46 is illustrated in FIG. 7. When the alarm sounds the vehicle operator can reverse the vehicle slightly to permit the arm 46 to again swing to a vertical position where it will clear the end 70 to contact 68 as shown in solid lines in FIG. 6. If desired, the vehicle operator can advance the vehicle slightly further so that arm 46 will be pivoted further to the broken line position 46a in FIG. 6 where button contact 72 has again moved out of contact with the offset free end 70 of contact 68. The alarm will then cease to operate.

Thus it will be seen that the signalling device of this invention permits a wide latitude for location of the device relative to the garage structure as well as the parked position of the vehicle. The lengthwise adjustment of bracket 34 within channel 26, the vertical adjustment of rod 50, the transverse adjustment of cross arm 56 and the variable positioning of antenna 22 on the vehicle all contribute to eliminate the necessity of restricting the positioning of the device relative to the structural design of the garage or the vehicle. Furthermore by designing the alarm so that it is actuated by an upwardly projecting antenna on the vehicle, the entire signalling device can be mounted in an overhead position. Thus it will be inaccessible to children and at the same time permit more usable space in the garage as compared with wall mounted signalling devices.

I claim:

1. In combination with a vehicle and a vehicle enclosure, such as a garage, having a ceiling structure, an alarm for signalling to the vehicle operator when the vehicle has advanced to a desired parking position in the garage comprising, an elongated support member mounted on the ceiling structure at a level above the roof of the vehicle and extending in a direction parallel to the longitudinal axis of the vehicle in said park position, a bracket mounted on said support for movement lengthwise thereof, means for locking the bracket in a fixed predetermined position lengthwise of the support, a generally vertically extending switch arm having an upper member and a lower member, said upper member having its upper end pivotally connected to said bracket for swinging movement about a horizontal axis extending perpendicular to the longitudinal axis of said support member, said lower member having its lower end terminating at a level above the roof of the vehicle, said lower arm member being movable vertically on the upper arm member so as to vary the extent to which the lower end of the arm projects downwardly from said pivot axis, means for locking said arms together in a predetermined fixedly extended position, a generally horizontally extending cross arm mounted on the lower end of the lower switch arm member, said cross arm being spaced above the roof of the vehicle when in said park position, said cross arm projecting transversely of the longitudinal axis of the vehicle from opposite sides of the switch arm, a vertically extending antenna mounted on the vehicle in a predetermined position and projecting upwardly above the roof of the vehicle, the upper end of said antenna lying in a plane above said cross arm and offset laterally from said switch arm when the vehicle is in said park position, said support member being mounted on said ceiling structure and said bracket being mounted on said support member in such positions in relation to said antenna so that one end portion of the cross arm lies in the path of travel of and is engaged by said antenna to tilt said switch arm forwardly when the vehicle is advanced to said part position and an alarm responsive to said forward tilting movement of said switch arm for signalling to the vehicle operator that the vehicle has advanced to said desired park position.

2. The combination called for in claim 1 wherein the cross arm is adjustable lengthwise on the lower end of the switch arm.

* * * * *